(12) United States Patent
Shi et al.

(10) Patent No.: US 10,445,924 B2
(45) Date of Patent: Oct. 15, 2019

(54) METHOD AND DEVICE FOR PROCESSING DVS EVENTS

(71) Applicants:SAMSUNG ELECTRONICS CO., LTD., Suwon-si (KR); Beijing Samsung Telecom R&D Center, Beijing (CN)

(72) Inventors: Feng Shi, Beijing (CN); Dong Qing Zou, Beijing (CN); Wei Heng Liu, Beijing (CN); De Heng Qian, Beijing (CN); Hyun Surk Ryu, Hwaseong-si (KR); Jia Li, Beijing (CN); Jing Tao Xu, Beijing (CN); Kyoobin Lee, Seoul (KR); Qiang Wang, Beijing (CN)

(73) Assignees: SAMSUNG ELECTRONICS CO., LTD., Suwon-si (KR); BEIJING SAMSUNG TELECOM R&D CENTER, Beijing (CN)

(*) Notice: Subject to any disclaimer, the term of this patent is extended or adjusted under 35 U.S.C. 154(b) by 18 days.

(21) Appl. No.: 15/811,200

(22) Filed: Nov. 13, 2017

(65) Prior Publication Data

US 2018/0137673 A1 May 17, 2018

(30) Foreign Application Priority Data

Nov. 14, 2016 (CN) .......................... 2016 1 1001931

(51) Int. Cl.
*G06T 15/20* (2011.01)
*G06K 9/62* (2006.01)
(Continued)

(52) U.S. Cl.
CPC .............. *G06T 15/20* (2013.01); *G06K 9/605* (2013.01); *G06K 9/6202* (2013.01); *G06T 15/04* (2013.01);
(Continued)

(58) Field of Classification Search
None
See application file for complete search history.

(56) References Cited

U.S. PATENT DOCUMENTS 8,600,166 B2 12/2013 Adhikari
8,687,891 B2 4/2014 Takacs et al.
(Continued)

FOREIGN PATENT DOCUMENTS

KR 10-2007-0027929 A 3/2007
KR 10-2011-0016160 A 2/2011
(Continued)

*Primary Examiner* — Jeffrey J Chow
(74) *Attorney, Agent, or Firm* — Sughrue Mion, PLLC (57) ABSTRACT

Embodiments of the present invention provide a method and device for processing Dynamic Vision Sensor (DVS) events. The method comprises the operations of: acquiring a DVS event map sequence; for any DVS event map in the DVS event map sequence, extracting a DVS event feature descriptor, where the DVS event feature descriptor has a scale-invariant feature and/or a rotation-invariant feature; determining, according to the extracted DVS event feature descriptor, a three-dimensional space pose of the DVS event map at the current moment; and, generating, according to the three-dimensional space pose of each DVS event map, a DVS event map sequence with temporal consistency. The embodiments of the present invention are used for generating, from a DVS event map sequence, a DVS event map sequence with temporal consistency.

17 Claims, 3 Drawing Sheets

(51) Int. Cl.
*G06T 15/04* (2011.01)
*G06K 9/60* (2006.01)
*G06K 9/00* (2006.01)

(52) U.S. Cl.
CPC .............. *G06K 2009/00738* (2013.01); *G06T 2207/10028* (2013.01); *G06T 2207/20208* (2013.01); *G06T 2207/30244* (2013.01)

(56) References Cited

U.S. PATENT DOCUMENTS

| | | |
|---|---|---|
| 8,781,162 B2 | 7/2014 | Zhu et al. |
| 2009/0238460 A1 | 9/2009 | Funayama et al. |
| 2011/0038540 A1 | 2/2011 | Ahn et al. |
| 2014/0347475 A1 | 11/2014 | Divakaran et al. |
| 2016/0224833 A1 | 8/2016 | Jin |
| 2017/0124693 A1* | 5/2017 | Ramalingam .......... G01B 11/14 |

FOREIGN PATENT DOCUMENTS

| | | |
|---|---|---|
| KR | 10-1064224 B1 | 9/2011 |
| KR | 10-1234046 B1 | 2/2013 |
| KR | 10-2013-0057584 A | 6/2013 |
| KR | 10-1582983 B1 | 1/2016 |

* cited by examiner

Event map  Distance maps in eight directions

FIG. 4

The eighth frame

The ninth frame

FIG. 5

METHOD AND DEVICE FOR PROCESSING DVS EVENTS

CROSS-REFERENCE TO RELATED APPLICATIONS

This application claims priority from Chinese Patent Application No. 201611001931.9, filed on Nov. 14, 2016, in the State Intellectual Property Office of the P.R.C., the disclosure of which is incorporated herein in its entirety by reference.

BACKGROUND

Apparatuses and methods consistent with the present invention relate to the computer vision field and in particular to a method and device for processing Dynamic Vision Sensor (DVS) events.

Recently, Dynamic Vision Sensor (DVS) cameras are used in the fields such as computer vision, artificial intelligence and robots. Compared with a conventional Complementary Metal-Oxide-Semiconductor (CMOS) sensor or a Charge Coupled Device (CCD) sensor, a DVS camera has the following three features so that the DVS camera is more applicable to applications with high real-time requirements.

1) Event asynchrony. Unlike the CMOS/CCD sensor, the DVS camera has an asynchronous imaging process, and each pixel can autonomously and individually generate events according to the change in illumination intensity of a scene. Therefore, when compared image data from the CMOS/CCD sensor where image data from all pixels are processed, in a DVS camera, image data from a smaller number of pixels can be quickly processed. As a result, the response speed of the DVS camera to the scene change is far quicker than that of the CMOS/CCD sensor, so that the DVS camera fundamentally offers a possibility of proposing and realizing a super real-time vision algorithm.

2) Event sparsity. Unlike the CMOS/CCD sensor, the DVS camera is a motion sensitive sensor, and captures only boundary or outline events of an object which has a relative motion and a change in illumination reaching a certain threshold. Therefore, the scene content can be described by only few events. The content to be processed by the DVS camera is greatly reduced when in comparison with the CMOS/CCD sensor so that the computation overhead can be saved to a large extent and the computation efficiency can be improved.

3) Illumination robustness. The events generated by the DVS are related to the change in illumination intensity of a scene. When the illumination change in a scene is greater than a given threshold, the DVS correspondingly generates a corresponding event for describing the change in scene content. Therefore, the DVS camera is a sensor which is robust in illumination change. The DVS camera will not result in scene texture attenuation or mirror effect due to the increase of the illumination intensity, so that the influences from the illumination, texture or other factors are reduced to a large extent.

Although the DVS camera has the features of low delay, low power consumption, high dynamic range or more, there is still a great difference in the imaging principle and image generation process between the DVS camera and the conventional optical camera. The event asynchrony and sparsity of the DVS camera will inevitably result in inconsistent event distribution and inconsistent number of contained events in different DVS event maps, wherein each image corresponds to a DVS event map and each DVS event map contains several events. Due to the characteristics of the inconsistent event distribution and the inconsistent number of events, the corresponding DVS event map sequence does not have the temporal consistency which is common to optical camera sequences, wherein the temporal consistency means that the event distribution and the number of events in event maps corresponding to two adjacent images frame in a DVS event map sequence are consistent.

If a DVS event map event without temporal consistency is used for subsequent pose recognition processing or three-dimensional reestablishment processing, the result of processing may not be accurate and robust. Therefore, the generation of a DVS event map sequence with temporal consistency becomes a challenge to be solved.

SUMMARY

To overcome the technical challenges or at least partially solve the technical challenges, the following exemplary embodiments are particularly provided.

An exemplary embodiment provides a method for processing Dynamic Vision Sensor (DVS) events, operations the method including: acquiring a DVS event map sequence; for any DVS event map in the DVS event map sequence, extracting a DVS event feature descriptor, the DVS event feature descriptor having a scale-invariant feature and/or a rotation-invariant feature; determining, according to the extracted DVS event feature descriptor, a three-dimensional space pose of the DVS event map at the current moment; and generating, according to the three-dimensional space pose of each DVS event map, a DVS event map sequence with temporal consistency.

Another exemplary embodiment provides a device for processing DVS events, including: an acquisition module configured to acquire a DVS event map sequence; an extraction module configured to, for any DVS event map in the DVS event map sequence, extract a DVS event feature descriptor, the DVS event feature descriptor having a scale-invariant feature and/or a rotation-invariant feature; a determination module configured to determine, according to the extracted DVS event feature descriptor, a three-dimensional space pose of the DVS event map at the current moment; and a generation module configured to generate, according to the three-dimensional space pose of each DVS event map, a DVS event map sequence with temporal consistency.

In an exemplary embodiment, there is a method for processing Dynamic Vision Sensor (DVS) events, including: acquiring a first DVS event map sequence, the first DVS event map sequence including a first DVS event map; extracting a first DVS event feature descriptor from the first DVS event map, the first DVS event feature descriptor having at least one from among a scale-invariant feature and a rotation-invariant feature; determining, based on the first DVS event feature descriptor, a three-dimensional space pose of the first DVS event map at a current moment; and generating, based on the three-dimensional space pose of the first DVS event map, a generated DVS event map sequence with a temporal consistency.

In another exemplary embodiment, there is a device for processing Dynamic Vision Sensor (DVS) events, the device including: at least one processor configured to implement: an acquisition module configured to acquire a first DVS event map sequence; an extraction module configured to, for a DVS event map in the first DVS event map sequence, extract a DVS event feature descriptor, the DVS event feature descriptor having at least one from among a scale-invariant feature and a rotation-invariant feature; a determination module configured to determine, based on the DVS event feature descriptor, a three-dimensional space pose of the DVS event map at a current moment; and a generation module configured to generate, based on the three-dimensional space pose of the DVS event map, a generated DVS event map sequence with a temporal consistency.

The exemplary embodiments provide a method and device for processing DVS events. In comparison with the imaging quality of a related art DVS camera, in the exemplary embodiments, by acquiring a DVS event map sequence, a DVS event feature descriptor having a scale-invariant feature and/or a rotation-invariant feature can be extracted from any DVS event map, a three-dimensional space pose of the DVS event map at the current moment can be determined, and a DVS event map sequence with temporal consistency can be generated. In other words, a DVS event feature descriptor having a scale-invariant feature and/or a rotation-invariant feature can be extracted, and a correspondence between DVS event maps at different moments can be effectively estimated. Thus, the temporal consistency of the generated event maps can be ensured. Consequently, during the subsequent pose recognition processing or three-dimensional reestablishment processing, the accuracy of the result of processing can be improved, and the result of processing is robust.

Additional aspects and features of the exemplary embodiments will be partially appreciated and become apparent from the description below.

BRIEF DESCRIPTION OF THE DRAWINGS

The above and/or additional aspects and features of the exemplary embodiments will become apparent and readily appreciated from the following descriptions taken in conjunction with the accompanying drawings, in which.

DETAILED DESCRIPTION OF EXEMPLARY EMBODIMENTS

Exemplary embodiments will be described in detail hereinafter. The examples of these embodiments have been illustrated in the accompanying drawings throughout which same or similar reference numerals refer to same or similar elements or elements having same or similar functions. The exemplary embodiments described with reference to the accompanying drawings are illustrative, merely used for explaining the present invention and should not be regarded as any limitations thereto.

It should be understood by one person of ordinary skill in the art that singular forms "a", "an", "the", and "said" may be intended to include plural forms as well, unless otherwise stated. It should be further understood that terms "comprise/ comprising" used in this specification specify the presence of the stated features, integers, steps, operations, elements and/or components, but not exclusive of the presence or addition of one or more other features, integers, steps, operations, elements, components, and/or combinations thereof. It should be understood that, when a component is referred to as being "connected to" or "coupled to" another component, it can be directly connected or coupled to other elements or provided with intervening elements therebetween. In addition, "connected to" or "coupled to" as used herein can comprise wireless connection or coupling. As used herein, the term "and/or" comprises all or any of one or more associated listed items or combinations thereof.

It should be understood by one person of ordinary skill in the art that, unless otherwise defined, all terms (including technical and scientific terms) used herein have the same meaning as commonly understood by one person of ordinary skill in the art to which the present invention belongs. It should be further understood that terms, such as those defined in commonly used dictionaries, should be interpreted as having a meaning that is consistent with their meanings in the context of the prior art and will not be interpreted in an idealized or overly formal sense unless expressly so defined herein.

It should be understood by one person of ordinary skill in the art that the term "terminal" and "terminal equipment" as used herein comprise not only devices with a wireless signal receiver having no emission capability but also devices with receiving and emitting hardware capable of carrying out bidirectional communication over a bidirectional communication link. Such devices can comprise cellular or other communication devices with a single-line display or multi-line display or without a multi-line display; Personal Communication Systems (PCSs) with combined functionalities of speech, data processing, facsimile and/or data communication; Personal Digital Assistants (PDAs), which may include radio frequency (RF) receivers, pagers, internet networks/intranet accesses, web browsers, notepads, calendars and/or global positioning system (GPS) receivers; and/ or conventional laptop and/or palmtop computers or other devices having and/or including a RF receiver. The "terminal" and "terminal equipment" as used herein can be portable, transportable, mountable in transportations (air, sea and/or land transportations), or suitable and/or configured to run locally and/or distributed in other places in the earth and/or space for running. The "terminal" or "terminal equipment" as used herein may be a communication terminal, an internet terminal, a music/video player terminal. For example, it can be a PDA, a Mobile Internet Device (MID) and/or a mobile phone with a music/video playback function, or can be equipment such as a smart TV and a set-top box.

Exemplary Embodiment 1

Figure 1:
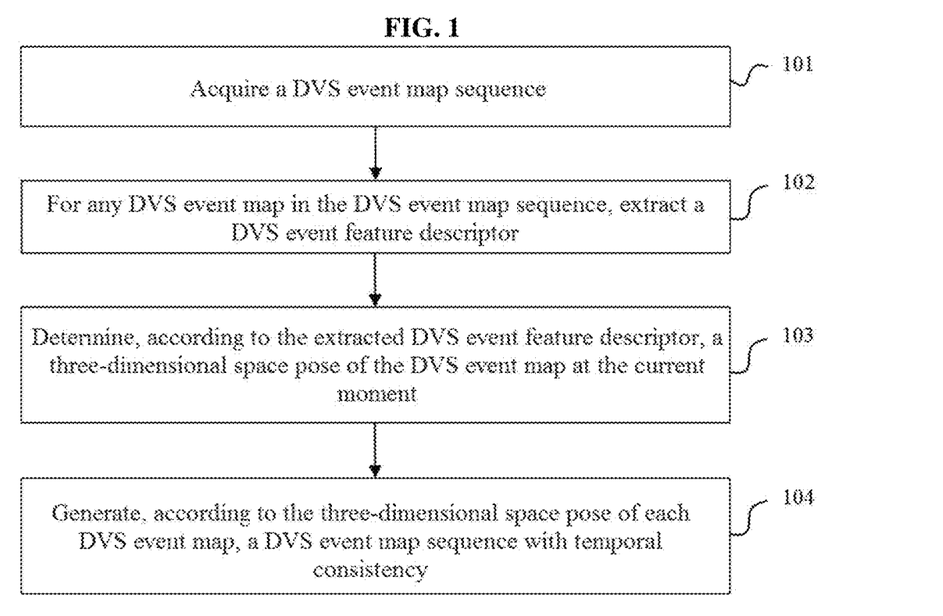
FIG. 1 is a flowchart of a method for processing DVS events according to an exemplary embodiment.

This exemplary embodiment provides a method for processing Dynamic Vision Sensor (DVS) events. As shown in FIG. 1, the method comprises the following operations.

Operation 101: A first DVS event map sequence is acquired.

Operation 102: For a first DVS event map in the first DVS event map sequence, a first DVS event feature descriptor is extracted.

The first DVS event feature descriptor has a scale-invariant feature and/or a rotation-invariant feature.

In this exemplary embodiment, the first DVS event map having a scale-invariant feature and/or a rotation-invariant feature means that, when a shooting distance and/or a shooting angle between a DVS camera and an object changes, the first DVS event feature descriptor extracted for the object has a feature of being capable of remaining unchanged.

Operation 103: A three-dimensional space pose of the first DVS event map at the current moment is determined according to or based on the first DVS event feature descriptor.

Operation 104: A generated DVS event map sequence with temporal consistency is generated according to or based on the three-dimensional space pose of a plurality of DVS event maps including the first DVS event map.

This exemplary embodiment provides a method for processing DVS events. In comparison with the imaging quality of a related art DVS camera, in this exemplary embodiment, by acquiring a DVS event map sequence, a DVS event feature descriptor having a scale-invariant feature and/or a rotation-invariant feature can be extracted from any DVS event map, a three-dimensional space pose of the DVS event map at the current moment can be determined, and a DVS event map sequence with temporal consistency can be generated. In other words, a DVS event feature descriptor having a scale-invariant feature and/or a rotation-invariant feature can be extracted, and a correspondence between DVS event maps at different moments can be effectively estimated. Thus, the temporal consistency of the generated event maps can be ensured. Consequently, during the subsequent pose recognition processing or three-dimensional reestablishment processing, the accuracy of the result of processing can be improved, and the result of processing is allowed to be robust.

In an exemplary embodiment, the generated DVS event map sequence comprises adjacent image frames, and event distribution of the adjacent image frames and a number of events in event maps corresponding to adjacent image frames are consistent Exemplary Embodiment 2

The operations shown in FIG. 1 are used for generating, for a single-camera video, a DVS event map sequence with temporal consistency. Preferably, but not necessarily, for a dual-camera video, the generation of a DVS event map sequence with temporal consistency is specifically shown in FIG. 2. The present exemplary embodiment includes the operation 101 of acquiring a DVS event map sequence as operation 201 in FIG. 2; the operation 102 of, for any DVS event map in the DVS event map event, extracting a DVS event feature descriptor as operation 202 in FIG. 2; and, the operations 203 to 204 are similar to those in the operations 103 to 104, and will not be repeated here.

Figure 2:
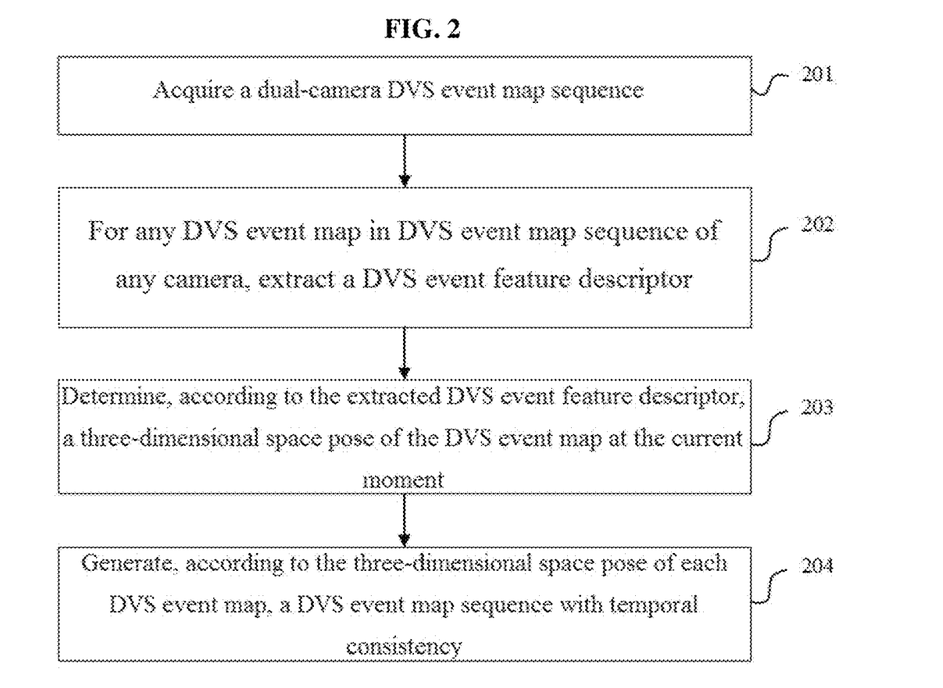
FIG. 2 is a flowchart of another method for processing DVS events according to an exemplary embodiment.

Operation 201: A dual-camera DVS event map sequence is acquired.

The dual-camera DVS event map sequence comprises a left-camera DVS event map sequence and a right-camera DVS event map sequence, both of which include a dual-camera DVS event map. In an exemplary embodiment, the left-camera DVS event map sequence and the right-camera DVS event map sequence are the first DVS event map sequence and the second DVS event map sequence.

Operation 202: For a second DVS event map in a second DVS event map sequence of any camera, a second DVS event feature descriptor is extracted.

In this exemplary embodiment, the DVS event map of any camera can be from a left-camera DVS event map sequence or a right-camera DVS event map sequence. This is not limited in this exemplary embodiment. In this exemplary embodiment, one DVS event map sequence contains a number of DVS event maps, each of which respectively corresponds to an image.

Exemplary Embodiment 3

Based on Exemplary Embodiment 2, Exemplary Embodiment 3 includes, before the operation 203 or after the operation 202 and before the operation 203 of determining, according to or based on the extracted DVS event feature descriptor, a three-dimensional space pose of the DVS event map at the current moment, an operation 303. The present exemplary embodiment includes the operation 203 of determining, according to or based on the extracted DVS event feature descriptor, a three-dimensional space pose of the DVS event map at the current moment specifically comprising an operation 304. The present exemplary embodiment also includes operations 301, 302, and 305, which are similar to operations 201, 202 and 204, and descriptions of which will not be repeated here.

Operation 303: For any DVS event map in DVS event map sequence of any camera, a depth value corresponding to each event is respectively determined according to or based on the DVS event feature descriptor.

Operation 304: For any DVS event map in DVS event map sequence of any camera, a three-dimensional space pose of the DVS event map at the current moment is determined according to or based on the depth value corresponding to each event and the extracted DVS event feature descriptor.

Exemplary Embodiment 4

Based on Exemplary Embodiment 3, Exemplary Embodiment 4 includes the operation 304 of, for any DVS event map in DVS event map sequence of any camera, determining, according to or based on the depth value corresponding to each event and the extracted DVS event feature descriptor, a three-dimensional space pose of the DVS event map at the current moment comprising operations 404 and 405. The present exemplary embodiment also includes operations 401, 402, 403, and 406, which are similar to operations 301, 302, 303, and 305, and descriptions of which will not be repeated here.

Operation 404: For any DVS event map in DVS event map sequence of any camera, according to or based on the depth value respectively corresponding to each event and the extracted DVS event feature descriptor, the DVS event map at the current moment is matched with a key frame, e.g., a first key frame, in the corresponding DVS event map sequence.

The key frame in the operation 404 refers to a key DVS event map.

Operation 405: A three-dimensional space pose of the DVS event map at the current moment is determined according to or based on a result of matching.

Exemplary Embodiment 5

Based on Exemplary Embodiment 4, Examiner Embodiment 5 includes, after the operation 405 or before the operation 406 and after operation 405 of determining, according to or based on a result of matching, a three-dimensional space pose of the DVS event map at the current moment, an operation 506. The present exemplary embodiment also includes the operation 406 of generating, according to or based on the three-dimensional space pose of each DVS event map, a DVS event map sequence with temporal consistency comprising an operation 507 Further, the present exemplary embodiment also includes operations 501, 502, 503 and 505, which are similar to operations 401, 402, 403 and 405, and the descriptions of which will not be repeated here.

Operation 506: The three-dimensional space pose of the DVS event map at the current moment is adjusted so that an accumulative error generated by the DVS event map during matching is less than a preset value.

Operation 507: A DVS event map sequence with temporal consistency is generated according to or based on the adjusted three-dimensional space pose of each DVS event map.

Exemplary Embodiment 6

Based on Exemplary Embodiment 2, Exemplary Embodiment 6 includes the operation 202 of, for any DVS event map in DVS event map sequence of any camera, extracting a DVS event feature descriptor comprising operations 602 and 603. The present exemplary embodiment includes operations 601, 604 and 605, which are similar to operations 201, 203, and 204, and descriptions of which will not be repeated here.

Operation 602: For any DVS event map in DVS event map sequence of any camera, a vision pyramid is created.

The number of layers of the vision pyramid is a first preset value, and a down-sampling coefficient between any two adjacent layers of the vision pyramid is a second preset value.

In this exemplary embodiment, the number of layers of the vision pyramid can be set as 8, and the down-sampling coefficient between any two adjacent layers of the pyramid can be set as 0.5. Then, the optimal scale-invariant feature of DVS images can be obtained. Accordingly, a better correspondence between DVS events can be obtained.

Operation 603: A scale-invariant DVS event feature descriptor is acquired according to or based on the vision pyramid.

Exemplary Embodiment 7

Based on Exemplary Embodiment 6, Exemplary Embodiment 7 includes the operation 603 of acquiring, according to or based on the vision pyramid, a DVS event feature descriptor with a scale-invariant feature 703 to 705 in Embodiment 7, wherein the operations in the operations 601, 602, 604 and 605 are similar to those in operations 701 to 702 and operations 706 to 707, and will not be repeated.

Operation 703: A corresponding distance map of each event in any layer of the vision pyramid in eight directions, i.e., in each of eight directions, is determined, respectively, i.e., a plurality of distance maps for a plurality of events are determined.

Operation 704: According to or based on the corresponding distance map of each event in any layer in any one of eight directions, a main direction of motion of each event in this layer is determined. Thus, a plurality of main direction of motions for a plurality of events in the layer is determined.

Operation 705: The DVS event feature descriptor is extracted according to or based on the corresponding distance map of each event in any layer in each of eight directions and the main direction of motion of each event in this layer.

Exemplary Embodiment 8

As another possible implementation of the exemplary embodiments, based on Exemplary Embodiment 7, the operation 703 of respectively determining a corresponding distance map of each event in any layer of the vision pyramid in each of eight directions comprises an operation 803 in Exemplary Embodiment 8; the operation 704 of determining, according to or based on the corresponding distance map of each event in any layer in each of eight directions, a main direction of motion of each event in this layer comprises operations 804 to 805 in Exemplary Embodiment 8; and, the operation 705 of extracting the DVS event feature descriptor according to or based on the corresponding distance map of each event in any layer in each of eight directions and the main direction of motion of each event in this layer comprises operations 806 to 809 in Exemplary Embodiment 8, wherein the operations in the operations 701 to 702 and the operations 706 to 707 are similar to those in operations 801 to 802 and operations 810 to 811, and will not be repeated here.

Operation 803: According to or based on a Euclidean distance from each event in any layer to the closest event in a preset direction and an attribute corresponding to the each event, a corresponding distance map of each event in the any layer in each of eight directions is determined, respectively. Hence, attributes corresponding to a plurality of events are determined.

Wherein, the attribute corresponding to each event comprises: non-event, negative polarity event and positive polarity event.

In this exemplary embodiment, the images generated by a DVS camera have a certain feature: events generally occur around the outlines of objects in a scene and reflect structure information of the objects. In this exemplary embodiment, the feature of the current event is described by calculating a distance from each event to other events in a given direction.

Figure 3:
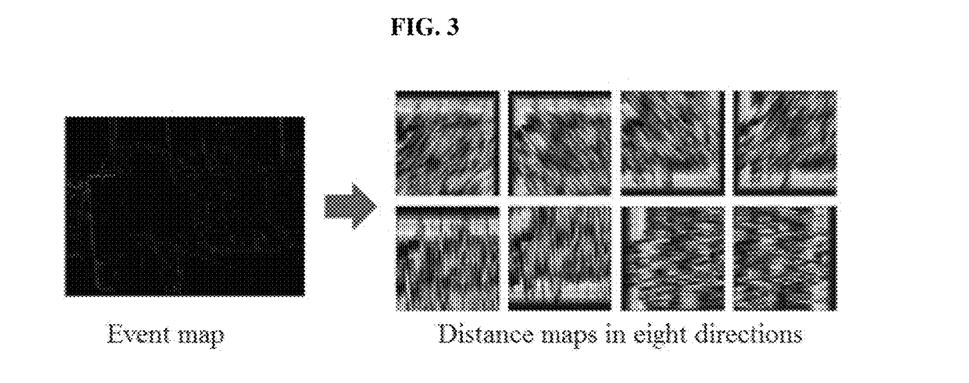
FIG. 3 illustrates distance maps in each of eight directions of all events in a layer of a vision pyramid.

Specifically, distance maps in each of eight directions of all events in a layer of a vision pyramid are shown in FIG. 3.

In this exemplary embodiment, the corresponding distance map of each event in a layer of a scale s in each of eight directions is determined by the following equation:

$$D(p_r^s(u,v))=d(p_r^s(u,v))+f(p_r^s(u,v)) \qquad \text{EQN [1].}$$

Wherein, $d(p_r^s(u,v))$ is a Euclidean distance from an event (u,v) in a layer of a scale s to the closest event in a direction r, and $f(p_r^s(u,v))$ is equal to 0, 1 and 2 respectively at the non-event, the negative polarity event and the positive polarity event.

Operation 804: For each event in any layer, a direction, e.g., a first direction, and a Euclidean distance from each DVS event within a neighborhood to the current event and the number of DVS events within the neighborhood of the current event are determined. Hence, first plurality of directions and Euclidean distances from DVS events are determined.

Wherein, the current event is an event being processed currently.

Operation 805: According to or based on the determined direction, Euclidean distance and the number of DVS events, a main direction of motion of the current event, i.e., a current main direction of motion or a main direction, is determined.

In this exemplary embodiment, the main direction of motion of the current event is determined according to or based on the following equation:

$$\text{Direction}(p) = \frac{1}{|\text{Neighbor}(p)|} \sum_{q \in \text{Neighbor}(p)} \left( \frac{\Delta t(p,q) * \Delta u(p,q)}{\Delta u(p,q)^2 + \Delta v(p,q)^2}, \right.$$
$$\left. \frac{\Delta t(p,q) * \Delta v(p,q)}{\Delta u(p,q)^2 + \Delta v(p,q)^2} \right). \quad \text{EQN [2]}$$

Wherein, Neighbor(p) denotes a neighborhood of an event p, |Neighbor(p)| denotes the number of events contained within the neighborhood of the event p, and Δu(p,q), Δv(p,q) and Δt(p,q) denote Euclidean distance of events p and q in directions u, v and t, respectively.

In this exemplary embodiment, the size of the neighborhood in the directions u, v and t can be set as optimal rotation-invariant features of the feature descriptor obtained at 80-pixel, 80-pixel and 5-frame.

Operation 806: Event sampling is performed on the corresponding distance map of each event in the current DVS event map in each of eight directions in a DVS event map layer of any scale of the vision pyramid, and the position of each sampled event is determined. Hence, performing event sampling is carried out.

In this exemplary embodiment, event sampling is performed on the corresponding distance map of each event in the current DVS event map in each of eight directions in a DVS event map layer of any scale of the vision pyramid, and the location of each sampled event is determined, wherein the position of the sampled event is expressed by $p_r^s$, so that determining locations for the plurality of sampled events are determined.

Wherein, s denotes the scale of the DVS event map layer and r denotes the direction of the distance map corresponding to the sampled event.

Operation 807: By using each sampled event as a center, image blocks of a preset pixel size are rotated and aligned in a process of rotating and aligning, to the main directions of motion of all DVS events in the DVS event map of this sampled event in this direction in this layer scale to obtain image blocks in each direction in each layer.

In this exemplary embodiment, in the corresponding distance map in each direction, $(p_r^s)$ is used as a center, and image blocks of a pixel size 21 are rotated and aligned to Direction($p_r^s$).

Operation 808: The image blocks are respectively convoluted in a process of convoluting, by a Gaussian kernel of a preset width to obtain a one-dimensional feature vector in each direction in each layer.

In this exemplary embodiment, the rotated image blocks can be convoluted by a Gaussian kernel of a width of 21, and the obtained image blocks are preferentially operated to obtain a one-dimensional feature vector which is expressed by F($p_r^s$).

Operation 809: A DVS event feature descriptor is extracted according to or based on the one-dimensional feature vector.

In this exemplary embodiment, the one-dimensional feature vector in each direction in each layer is listed to form a final feature descriptor for the event p.

Wherein, the final feature descriptor for the event p is expressed by:

$$F(p) = (F(p_1^1), \ldots, F(p_8^1), F(p_1^2), \ldots, F(p_8^8)) \quad \text{EQN [3]}.$$

Exemplary Embodiment 9

As another possible implementation of the exemplary embodiments, based on Exemplary Embodiment 3, the operation 303 of, for any DVS event map in DVS event map sequence of any camera, determining, according to or based on the DVS event feature descriptor, a depth value corresponding to each event comprises operations 903 to 905 in Exemplary Embodiment 9, wherein the operations in the operations 301 to 302 and the operations 304 to 305 are similar to those in operations 901 to 902 and operations 906 to 907, and will not be repeated here.

Operation 903: For any event in any DVS event map in DVS event map sequence of any camera, by using the current event as a center, according to or based on the DVS event feature descriptor for any event in image blocks of a preset pixel size, a feature matching cost of the any event in the two-camera DVS event map at the current moment is determined.

Wherein, the image blocks of a preset pixel size can be image blocks of a pixel size of 10.

Operation 904: Parallax of the current event is determined according to or based on the determined feature matching cost.

In this exemplary embodiment, if the current event is an event in the left-camera DVS event map, the feature matching cost of the current event is calculated according to or based on the following equation:

$$C(p,d) = \sum_{q \in W} |F^L(q) - F^R(qd)|. \quad \text{EQN [4]}$$

where, W denotes image blocks of a preset pixel size in the left-camera DVS event map by using an event p as a center, $F^L(q)$ denotes a scale and/or rotation-invariant DVS event feature descriptor corresponding to an event $q=(u_q, v_q)$ in the left-camera DVS event map, and $F^R(qd)$ denotes a scale and/or rotation-invariant DVS event feature descriptor corresponding to an event $qd=(u_q-d, v_q)$ in a right-camera DVS event map; or, if the current event is an event in a right-camera DVS event map, the feature matching cost of the current event is calculated according to or based on the following equation:

$$C(p,d) = \sum_{q \in W} |F^R(q) - F^l(qd)|. \quad \text{EQN [5]}$$

where, W denotes image blocks of a preset pixel size in the right-camera DVS event map by using an event p as a center, $F^R(q)$ denotes a scale and/or rotation-invariant DVS event feature descriptor corresponding to an event $q=(u_q, v_q)$ in the right-camera DVS event map, and $F^L(qd)$ denotes a scale and/or rotation-invariant DVS event feature descriptor corresponding to an event $qd=(u_q-d, v_q)$ in the left-camera DVS event map.

In this exemplary embodiment, a parallax value corresponding to the current event is determined according to or based on the following equation:

$$C_A^0(p,d) = C(p,d); \; C_A^i(p,d) = \sum_{q \in w} C_A^{i-1}(q,d). \quad \text{EQN [6]}$$

(Wherein, when 1≤d≤90, the minimum value of $C_A^i(p,d)$ is used as the parallax value corresponding to the current event, where W denotes image blocks of a preset pixel size in the left-camera event map by using p as a center. For example, $C_A^i(p,d)$ can be $C_A^5(p,d)$.

Wherein, the image blocks of a preset size can be image blocks of a pixel size of 10.

Operation 905: A depth value corresponding to the current event is determined according to or based on the parallax of the current event.

In this exemplary embodiment, if the current event is an event in the left-camera DVS event map, the depth value corresponding to the current event is determined according to or based on the following equation:

$$\text{Depth}(p) = (f_u^{left} * \text{Baseline}) / D_e(p), \quad \text{EQN [7]}$$

where, Depth(p) is the depth value corresponding to the current event, Baseline is a baseline distance between left-camera and right-camera DVSs, $f_u^{left}$ is the focal length of the left-camera DVS in a direction u, and the values of Baseline and $f_u^{left}$ are obtained by marking in advance.

In this exemplary embodiment, if the current event is an event in the right-camera DVS event map, the depth value corresponding to the current event is determined according to or based on the following equation:

$$\text{Depth}(p) = (f_u^{right} * \text{Baseline}) / D_e(p), \quad \text{EQN [8]}$$

where, Depth(p) is the depth value corresponding to the current event, Baseline is a baseline distance between left-camera and right-camera DVSs, $f_u^{right}$ is the focal length of the right-camera DVS in a direction u, and the values of Baseline and $f_u^{right}$ are obtained by marking in advance.

Exemplary Embodiment 10

As another implementation of the exemplary embodiments, based on Exemplary Embodiment 3, the operation 304 of, for any DVS event map in DVS event map sequence of any camera, determining, according to or based on the depth value corresponding to each event and the extracted DVS event feature descriptor, a three-dimensional space pose of the DVS event map at the current moment comprises operations 1004 to 1006 in Exemplary Embodiment 10, wherein the operations in the operations 301 to 303 and the operation 305 are similar to those in operations 1001 to 1003 and operation 1007, and will not be repeated here.

Operation 1004: A correspondence between DVS event maps at different moments is established according to or based on the extracted DVS event feature descriptor, i.e., a process of establishing the correspondence between the DVS event maps at different moments according to or based on the extracted DVS event feature descriptor, is performed.

In this exemplary embodiment, a correspondence between event maps of a left-camera DVS camera or a right-camera DVS camera at different moments is established.

Operation 1005: According to or based on the correspondence between DVS event maps at different moments and the depth value corresponding to each DVS event, a three-dimensional space relative motion matrix between DVS event maps at different moments is determined.

Operation 1006: According to or based on the three-dimensional space relative motion matrix between DVS event maps at different moments and a three-dimensional space pose of a corresponding DVS event map at a previous moment, i.e., a previous DVS event map, a three-dimensional space pose of the DVS event map at the current moment is determined.

Wherein, the three-dimensional space pose of the corresponding DVS event map at the previous moment, i.e., a previous three-dimensional space pose, is acquired in advance.

Exemplary Embodiment 11

As another possible implementation of the exemplary embodiments, based on Exemplary Embodiment 5, the operation 506 of adjusting the three-dimensional space pose of the DVS event map at the current moment so that an accumulative error generated for the DVS event map during matching is less than a preset value comprises operations 1106 to 1111 in Exemplary Embodiment 11, wherein the operations in the operations 501 to 505 and the operation 507 are similar to those in operations 1101 to 1105 and operation 1112, and will not be repeated here.

Operation 1106: A key frame map is created.

Wherein, each key frame in the key frame map represents a DVS event map at a different moment, respectively.

In this exemplary embodiment, a key frame map can be created for the current scene. The $i^{th}$ key frame in the key frame map is expressed by $\xi_i$ and represents a DVS event map at a certain moment.

Operation 1107: A correspondence between each event in the DVS event map at the current moment and each event, i.e., key event, in a key frame of the key frame map is determined.

In this exemplary embodiment, the first node of the key frame map is initialized as the first event map in the left-camera DVS event sequence or the first event map in the right-camera DVS event sequence. In this exemplary embodiment, the three-dimensional pose of a left-camera DVS event map or a right-camera DVS event map is initialized as an origin of a coordinate system. When a new DVS event map is input, based on the extracted DVS event feature descriptor, a DVS event correspondence between the new DVS event map and the last key frame in the key frame map is established by brute-force searching.

Operation 1108: A preset number of DVS event pairs are randomly selected in a selecting process or in determining DVS event pairs, from the correspondence between each event in the DVS event map at the current moment and each event in a key frame of the key frame map.

In this exemplary embodiment, the preset number of DVS event pairs can be three DVS event pairs.

Operation 1109: According to or based on a preset motion model, a relative motion between two DVS event maps among the DVS event pairs is calculated, and DVS event pairs conforming to the relative motion are determined.

In this exemplary embodiment, as many sub-sample sets as possible conforming to a relative motion model of six degrees of freedom are selected from the correspondence between each event in the current DVS event map and each event of a DVS event map in the key frame map by a Random Sample Consensus (RANSAC) algorithm.

Operation 1110: When a calculated number of DVS event pairs conforming to the relative motion is greater than a preset threshold, a three-dimensional space relative motion matrix between the DVS event map at the current moment and the key frame map is calculated.

In this exemplary embodiment, the preset threshold can be 60, 70 or 80. This is not limited in this exemplary embodiment.

In this exemplary embodiment, when the number of DVS events conforming to the preset motion model is greater than the preset threshold, for the searched events, a three-dimensional space relative motion matrix between the DVS event map at the current moment and the key frame map is calculated by a least square method.

Operation 1111: According to or based on the calculated three-dimensional space relative motion matrix, three-dimensional space poses of the DVS event map at the current moment and the key frame in the key frame map are adjusted so that an accumulative error generated for the DVS event map during matching is less than a preset value.

In this exemplary embodiment, based on the calculated relative motion information, whether the DVS event map at the current moment should be added into the key frame map is determined by the following two conditions. Wherein, the two conditions comprise:

(1) the number of events in the event map exceeds 500; and (2) the distance from this event map to the last key frame in the key frame map exceeds 10 mm.

In this exemplary embodiment, when a new key frame is added into the key frame map, two edges need to be added simultaneously to this key frame map, with one edge connecting the latest key frame and the second latest key frame, while the other edge connecting the latest key frame and the previously and randomly selected key frame. Three-dimensional space poses of all nodes in the key frame map are bound for adjustment by optimizing the following equation, in order to maintain the global consistency of three-dimensional space poses of the DVS event maps and reduce the accumulative error generated for the DVS event maps during matching.

Specifically, the three-dimensional space pose of the DVS event map at the current moment is adjusted according to or based on the equation:

$$\min_{\xi_1, \dots, \xi_N} \sum_E \|e(\xi_i, \xi_j)^T e(\xi_i, \xi_j)\|_h^2, \qquad \text{EQN [9]}$$

so that the accumulative error generated for the DVS event map during matching is less than the preset value.

Wherein, N denotes the number of nodes in the key frame map; E denotes a set formed by edges in the key frame map; $\|\cdot\|_h$ is a Huber norm; and, $e(\xi_i,\xi_j)=T_i{}^*T_{ij}{}^*(T_j)^{-1}$, where $e(\xi_i,\xi_j)$ is an error generated due to the inconsistency between the three-dimensional space poses of the $i^{th}$ and $j^{th}$ key frames and their relative motions, $T_i$ is a three-dimensional space pose of the DVS event map at a moment i, $T_j$ is a three-dimensional space pose of the DVS event map at a moment j, and Tij is a three-dimensional space relative motion matrix between the DVS event map at the moment i and the DVS event map at the moment j.

In this exemplary embodiment, an accumulative error generated for the DVS event map during matching is less than a preset value, and can be 0.01 or 0.001. This is not limited in this exemplary embodiment.

Exemplary Embodiment 12

As another possible implementation of the exemplary embodiments, based on Exemplary Embodiment 11, the operation 1112 of generating, according to or based on the adjusted three-dimensional space pose of each DVS event map, a DVS event map sequence with temporal consistency comprises an operation 1212 in Exemplary Embodiment 12, wherein the operations in the operations 1101 to 1111 are similar to those in operations 1201 to 1211, and will not be repeated here.

Operation 1212: Each DVS event in all key frames in the key frame map are projected onto the DVS event map at the current moment to generate a DVS event map sequence with temporal consistency.

In this exemplary embodiment, by projecting events in all key frames in the key frame map onto the DVS event map at the current moment, and by aggregation, DVS event maps with temporal consistency are generated.

Exemplary Embodiment 13

As another possible implementation of the exemplary embodiments, based on Exemplary Embodiment 12, the operation 1212 of projecting each DVS event in all key frames in the key frame map onto the DVS event map at the current moment to generate a DVS event map sequence with temporal consistency comprises an operation 1312 in Exemplary Embodiment 13, wherein the operations in the operations 1201 to 1211 are similar to those in operations 1301 to 1311, and will not be repeated here.

Operation 1312: According to or based on the three-dimensional space pose of each event in the key frame, in accordance with the DVS event map at the current moment, the three-dimensional space pose of the key frame, i.e., the key three-dimensional space pose, and the focal lengths and optical centers of a DVS sensor in a horizontal direction and a vertical direction, each DVS event in all key frames, i.e., in a plurality of key frames, are projected onto the DVS event map at the current moment to generate a DVS event map sequence with temporal consistency.

In this exemplary embodiment, by taking the $i^{th}$ key frame in the key frame map as example, if the event (u,v,d) is an event in the left-camera DVS event map, the process of projecting the event (u,v,d) onto the current event map can be expressed by the following equation:

$$\omega=((u,v,d),T_i,T_c)=\pi^{-1}(T_c{}^*(T_i)^{-1}{}^*\pi(u,v,d))=(u_c,v_c,d_c), \qquad \text{EQN [10]}$$

where:

$$\pi(u, v, d) = \left(\frac{(u - c_u^{left})d}{f_u^{left}}, \frac{(v - c_v^{left})d}{f_v^{left}}, d, 1\right)^T, \qquad \text{EQN [11]}$$

$$\pi^{-1}(x, y, z) = \left(f_u^{left}\frac{x}{z} + c_u^{left}, f_v^{left}\frac{y}{z} + c_v^{left}, z\right)^T,$$

where ($u_c$, $v_c$, $d_c$) denotes the two-dimensional coordinates and depth value of the event (u,v,d) projected onto the event map at the current moment; $T_c$ and $T_i$ are the three-dimensional space pose of the DVS event map at the current moment and the three-dimensional space pose of the $i^{th}$ key frame, respectively; $f_u^{left}$ and $f_v^{left}$ denote the focal lengths of the left-camera DVS sensor in the horizontal and vertical directions, respectively; $c_u^{left}$ and $c_v^{left}$ denote the optical centers of the left-camera DVS sensor in the horizontal and vertical directions, respectively; and, the four above values are set in advance.

Figure 4:
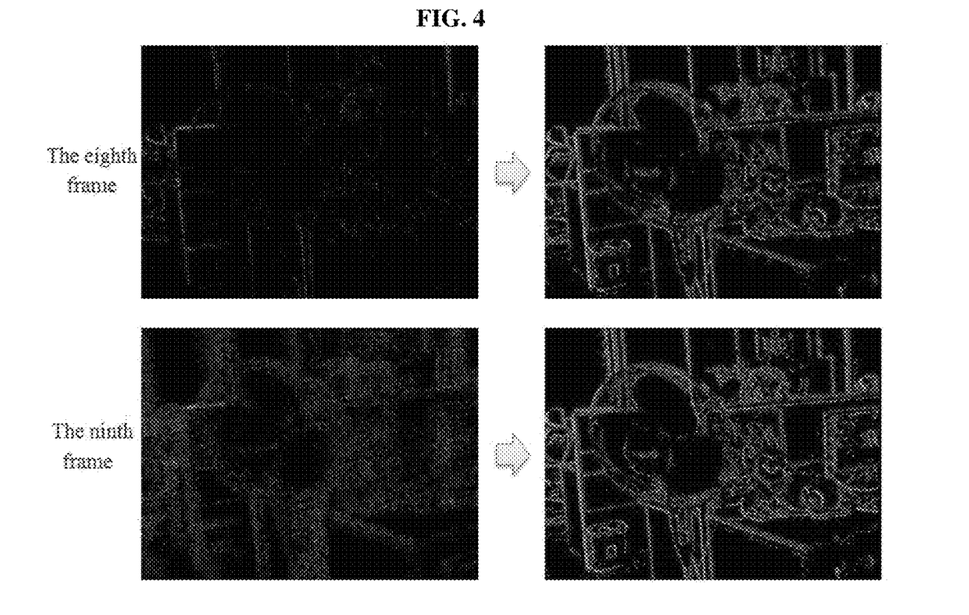
FIG. 4 illustrates a DVS event map sequence with temporal consistency.

A DVS event map sequence with temporal consistency generated in this exemplary embodiment is shown in FIG. 4.

In this exemplary embodiment, by taking the $i^{th}$ key frame in the key frame map as example, if the event (u,v,d) is an event in the right-camera DVS event map, the process of projecting the event (u,v,d) onto the current event map can be expressed by the following equation:

$$\omega=((u,v,d),T_i,T_c)=\pi^{-1}(T_c{}^*(T_i)^{-1}{}^*\pi(u,v,d))=(u_c,v_c,d_c), \qquad \text{EQN [12]}$$

where:

$$\pi(u, v, d) = \left(\frac{(u - c_u^{right})d}{f_u^{right}}, \frac{(v - c_v^{right})d}{f_v^{right}}, d, 1\right)^T, \qquad \text{EQN [13]}$$

-continued
$$\pi^{-1}(x, y, z) = \left(f_u^{right}\frac{x}{z} + c_u^{right}, f_v^{right}\frac{y}{z} + c_v^{right}, z\right)^T,$$

where $(u_c, v_c, d_c)$ denotes the two-dimensional coordinates and depth value of the event (u,v,d) projected onto the event map at the current moment; $T_c$ and $T_i$ are the three-dimensional space pose of the DVS event map at the current moment and the three-dimensional space pose of the $i^{th}$ key frame, respectively; $f_u^{right}$ and $f_v^{right}$ denote the focal lengths of the right-camera DVS sensor in the horizontal and vertical directions, respectively; $c_u^{right}$ and $c_v^{right}$ denote the optical centers of the right-camera DVS sensor in the horizontal and vertical directions, respectively; and, the four above values are set in advance.

Exemplary Embodiment 14

As another possible implementation of the exemplary embodiments, based on Exemplary Embodiment 13, before the operation 1312 of, according to or based on the three-dimensional space pose of each event in the key frame, in accordance with the DVS event map at the current moment, the three-dimensional space pose of the key frame, and the focal lengths and optical centers of a DVS sensor in horizontal and vertical directions, projecting each DVS event in all key frames onto the DVS event map at the current moment to generate a DVS event map sequence with temporal consistency, an operation 1412 is further included in Exemplary Embodiment 14, wherein the operations in the operations 1301 to 1312 are similar to those in operations 1401 to 1411 and operation 1413, and will not be repeated here.

Operation 1412: Numerical values of the focal lengths and optical centers of the DVS sensor in horizontal and vertical directions are marked in advance.

Figure 5:
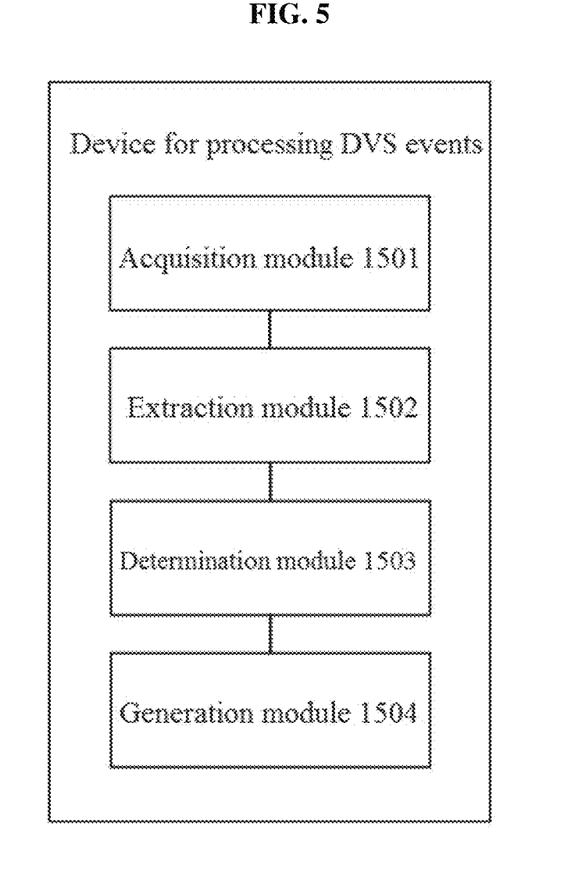
FIG. 5 is a schematic structure diagram of a device for processing DVS events according to an exemplary embodiment.

An exemplary embodiment provides a device for processing DVS events. As shown in FIG. 5, the device comprises: an acquisition module 1501, an extraction module 1502, a determination module 1503 and a generation module 1504, wherein:

the acquisition module 1501 is configured to acquire a DVS event map sequence;

the extraction module 1502 is configured to, for any DVS event map in the DVS event map sequence, extract a DVS event feature descriptor, the DVS event feature descriptor having a scale-invariant feature and/or a rotation-invariant feature, wherein, the DVS event feature descriptor has a scale-invariant feature and/or a rotation-invariant feature;

the determination module 1503 is configured to determine, according to or based on the extracted DVS event feature descriptor, a three-dimensional space pose of the DVS event map at the current moment; and the generation module 1504 is configured to generate, according to or based on the three-dimensional space pose of each DVS event map, a DVS event map sequence with temporal consistency.

In comparison with a related art DVS camera, in the device for processing DVS in this exemplary embodiment, by acquiring a DVS event map sequence, a DVS event feature descriptor having a scale-invariant feature and/or a rotation-invariant feature can be extracted from any DVS event map, a three-dimensional space pose of the DVS event map at the current moment can be determined, and a DVS event map sequence with temporal consistency can be generated. In other words, a DVS event feature descriptor having a scale-invariant feature and/or a rotation-invariant feature can be extracted, and a correspondence between DVS event maps at different moments can be effectively estimated. Thus, the temporal consistency of the generated event maps can be ensured. Consequently, during the subsequent pose recognition processing or three-dimensional reestablishment processing, the accuracy of the result of processing can be improved, and the result of processing is allowed to be robust for generating a video image.

The device for processing DVS events provided in this exemplary embodiment can implement the method embodiments described above, and the specific function implementations refer to the descriptions in the method embodiments and will not be repeated here. The device for processing DVS events provided in this exemplary embodiment can be suitable for generating a DVS event map as a DVS event map with temporal consistency, but is not limited thereto.

It should be understood by those skilled in the art that the present invention involves devices for carrying out one or more of operations as described in the present invention. Those devices can be specially designed and manufactured as intended, or can comprise well known devices in a general-purpose computer. Those devices have computer programs stored therein, which are selectively activated or reconstructed. Such computer programs can be stored in device (such as computer) readable media or in any type of media suitable for storing electronic instructions and respectively coupled to a bus, the computer readable media include but are not limited to non-transitory machine readable medium, any type of disks (including floppy disks, hard disks, optical disks, CD-ROM and magneto optical disks), ROM (Read-Only Memory), RAM (Random Access Memory), EPROM (Erasable Programmable Read-Only Memory), EEPROM (Electrically Erasable Programmable Read-Only Memory), flash memories, magnetic cards or optical line cards. In other words, the readable media comprise any media storing or transmitting information in a device (for example, computer) readable form.

It should be understood by those skilled in the art that computer program instructions can be used to realize each block in structure diagrams and/or block diagrams and/or flowcharts as well as a combination of blocks in the structure diagrams and/or block diagrams and/or flowcharts. It should be understood by those skilled in the art that these computer program instructions can be provided to general purpose computers, special purpose computers or other processors of programmable data processing means to be implemented, so that solutions designated in a block or blocks of the structure diagrams and/or block diagrams and/or flow diagrams are executed by computers or other processors of programmable data processing means.

It may be understood by those skilled in the art that the operations, measures and solutions in the operations, methods and flows already discussed in the present invention may be alternated, changed, combined or deleted. Further, other operations, measures and solutions in the operations, methods and flows already discussed in the present invention can also be alternated, changed, rearranged, decomposed, combined or deleted. Further, the operations, measures and solutions of the prior art in the operations, methods and operations disclosed in the present invention can also be alternated, changed, rearranged, decomposed, combined or deleted.

The foregoing descriptions are merely some implementations of the present invention. It should be noted that, to a person of ordinary skill in the art, various improvements and modifications can be made without departing from the principle of the present invention, and these improvements and modifications shall be regarded as falling into the protection scope of the present invention.

What is claimed is:

1. A method for processing Dynamic Vision Sensor (DVS) events, comprising:
    acquiring a first DVS event map sequence comprising a first DVS event map, and a second DVS event map sequence comprising a second DVS event map, the first DVS event map sequence and the second DVS event map sequence being of a dual-camera DVS event map sequence;
    extracting a first DVS event feature descriptor from the first DVS event map, and a second DVS event feature descriptor from the second DVS event map;
    determining, based on the first DVS event feature descriptor, a three-dimensional space pose of the first DVS event map at a current moment; and
    generating, based on the three-dimensional space pose of the first DVS event map, a generated DVS event map sequence with a temporal consistency for generating a video image,
    wherein the first DVS event feature descriptor having at least one from among a scale-invariant feature and a rotation-invariant feature,
    wherein the extracting the second DVS event feature descriptor comprises:
        generating a vision pyramid for the second DVS event map, a number of layers of the vision pyramid being a first preset value, a down-sampling coefficient between any two adjacent layers of the vision pyramid being a second preset value; and
        acquiring, based on the vision pyramid, a scale-invariant DVS event feature descriptor.

2. The method for processing Dynamic Vision Sensor (DVS) events according to claim 1, further comprising, before the determining, based on the first DVS event feature descriptor, the three-dimensional space pose of the first DVS event map at the current moment:
    determining, based on the first DVS event feature descriptor, a depth value corresponding to an event,
    wherein the determining, based on the first DVS event feature descriptor, the three-dimensional space pose of the first DVS event map at the current moment comprises:
        determining, based on the depth value corresponding to the event and the first DVS event feature descriptor, the three-dimensional space pose of the first DVS event map at the current moment.

3. The method for processing Dynamic Vision Sensor (DVS) events according to claim 2, wherein the determining, based on the depth value corresponding to the event and the first DVS event feature descriptor, the three-dimensional space pose of the first DVS event map at the current moment comprises:
    based on the depth value corresponding to the event and the first DVS event feature descriptor, matching the first DVS event map at the current moment with a key frame in the first DVS event map sequence; and
    determining, based on a result of matching, the three-dimensional space pose of the first DVS event map at the current moment.

4. The method for processing Dynamic Vision Sensor (DVS) events according to claim 3, further comprising, after the determining, based on the result of the matching, the three-dimensional space pose of the first DVS event map at the current moment:
    adjusting the three-dimensional space pose of the first DVS event map at the current moment so that an accumulative error generated for the first DVS event map during the matching is less than a preset value,
    wherein the generating, based on the three-dimensional space pose of the first DVS event map, the generated DVS event map sequence with the temporal consistency comprises:
        generating, based on the three-dimensional space pose that has been adjusted, of the first DVS event map, the generated DVS event map sequence with the temporal consistency.

5. The method for processing Dynamic Vision Sensor (DVS) events according to claim 1, the acquiring, based on the vision pyramid, the scale-invariant DVS event feature descriptor comprises:
    determining a plurality of distance maps for a plurality of events in a layer of the vision pyramid in eight directions;
    determining, based on the plurality of distance maps, a plurality of main direction of motions of the plurality of events in the layer; and
    extracting the first DVS event feature descriptor based on the plurality of distance maps and the plurality of main direction of motions of the plurality of events in the layer.

6. The method for processing Dynamic Vision Sensor (DVS) events according to claim 5, wherein the determining the plurality of distance maps comprises:
    determining, based on Euclidean distances from the plurality of events in the layer to a closest event in a preset direction and attributes corresponding to the plurality of events, the plurality of distance maps in the eight directions;
    wherein the attributes corresponding to the plurality of events comprises:
        non-event, negative polarity event and positive polarity event;
    wherein the determining the plurality of main direction of motions comprises:
        for the plurality of events in the layer, determining a first plurality of directions and the Euclidean distances from DVS events within a neighborhood to a current event and a number of the DVS events within the neighborhood of the current event; and
        determining, based on the first plurality of directions, the Euclidean distances and the number of the DVS events, a current main direction of motion of the current event; and
    wherein the extracting the first DVS event feature descriptor based on the plurality of distance maps and the plurality of main direction of motions of the plurality of events in the layer comprises:
        performing event sampling on the plurality of distance maps of the plurality of events in a current DVS event map in the eight directions in the layer of the vision pyramid, and determining locations of a plurality of sampled events;
        by using the plurality of sampled events as centers, rotating and aligning image blocks with a preset pixel size to a main direction of the plurality of main direction of motions of a sampled event in a direction in the layer to obtain the image blocks in the eight directions in the layer;

respectively convoluting the image blocks by a Gaussian kernel with a preset width to obtain a one-dimensional feature vector in the eight directions in the layer; and
extracting the first DVS event feature descriptor based on the one-dimensional feature vector.

7. The method for processing Dynamic Vision Sensor (DVS) events according to claim 2, wherein the determining, based on the first DVS event feature descriptor, the depth value corresponding to the event comprises:
for the first DVS event map, determining, by using a current event as a center, based on the first DVS event feature descriptor of a plurality of events in image blocks with a preset pixel size, a feature matching cost of the current event in a dual-camera DVS event map at the current moment;
determining a parallax of the current event based on the feature matching cost; and
determining, based on the parallax of the current event, the depth value corresponding to the current event.

8. The method for processing Dynamic Vision Sensor (DVS) events according to claim 2, wherein the determining, based on the depth value corresponding to the event and the first DVS event feature descriptor, the three-dimensional space pose of the first DVS event map at the current moment comprises:
establishing, based on the first DVS event feature descriptor, a correspondence between a plurality of DVS event maps at different moments;
determining, based on the correspondence between the plurality of DVS event maps at different moments and the depth value respectively corresponding to the a DVS event, a three-dimensional space relative motion matrix between the plurality of DVS event maps at different moments; and
determining, based on the three-dimensional space relative motion matrix between the plurality of DVS event maps at different moments and a previous three-dimensional space pose of a previous DVS event map at a previous moment, the three-dimensional space pose of the first DVS event map at the current moment.

9. The method for processing Dynamic Vision Sensor (DVS) events according to claim 4, wherein the adjusting the three-dimensional space pose of the first DVS event map at the current moment so that the accumulative error generated for the first DVS event map during the matching is less than the preset value comprises:
generating a key frame map, wherein a plurality of key frames in the key frame map represent a plurality of DVS event maps at different moments, respectively;
determining a correspondence between the event in the first DVS event map at the current moment and a key event in a first key frame of the plurality of key frames of the key frame map;
randomly selecting, from the correspondence between the event in the first DVS event map at the current moment and the key event in the first key frame of the plurality of key frames of the key frame map, a preset number of DVS event pairs;
calculating, based on a preset motion model, a relative motion between two DVS event maps among the preset number of DVS event pairs, and determining DVS event pairs conforming to the relative motion to determine a calculated number of DVS event pairs;
when the calculated number of DVS event pairs conforming to the relative motion is greater than a preset threshold, calculating a three-dimensional space relative motion matrix between the first DVS event map at the current moment and the key frame map; and
adjusting, based on the three-dimensional space relative motion matrix, the three-dimensional space pose of the first DVS event map at the current moment and a key three-dimensional space pose of the first key frame of the plurality of key frames in the key frame map so that the accumulative error is less than the preset value.

10. The method for processing Dynamic Vision Sensor (DVS) events according to claim 9, wherein the generating, based on the three-dimensional space pose that has been adjusted, of the first DVS event map, the generated DVS event map sequence with the temporal consistency comprises:
projecting a plurality of events in the plurality of key frames in the key frame map onto the first DVS event map at the current moment to generate the generated DVS event map sequence with the temporal consistency.

11. The method for processing Dynamic Vision Sensor (DVS) events according to claim 10, wherein the projecting the plurality of events in the plurality of key frames in the key frame map onto the first DVS event map at the current moment to generate the generated DVS event map sequence with the temporal consistency comprises:
based on the three-dimensional space pose of the plurality of events in the plurality of key frames the first DVS event map at the current moment, the three-dimensional space pose of the key frame, and focal lengths and optical centers of a DVS sensor in a horizontal direction and a vertical direction, projecting the plurality of events in the plurality of key frames onto the first DVS event map at the current moment to generate the generated DVS event map sequence with the temporal consistency.

12. The method for processing Dynamic Vision Sensor (DVS) events according to claim 11, further comprising, before the projecting the plurality of events in the plurality of key frames onto the first DVS event map at the current moment to generate the generated DVS event map sequence with the temporal consistency:
marking in advance numerical values of the focal lengths and the optical centers of the DVS sensor in horizontal and vertical directions.

13. A device for processing Dynamic Vision Sensor (DVS) events, the device comprising:
at least one processor configured to:
acquire a first DVS event map sequence and a second DVS event map sequence, the first DVS event map sequence and the second DVS event map sequence being of a dual-camera DVS event map sequence;
extract a first DVS event feature descriptor from the first DVS event map, and a second DVS event feature descriptor from the second DVS event map;
determine, based on the first DVS event feature descriptor and the second DVS event feature descriptor, a three-dimensional space pose of the first DVS event map at a current moment; and
generate, based on the three-dimensional space pose of the first DVS event map, a generated DVS event map sequence with a temporal consistency,
wherein the first DVS event feature descriptor having at least one from among a scale-invariant feature and a rotation-invariant feature,
wherein the extract the second DVS event feature descriptor comprises:

generate a vision pyramid for the second DVS event map, a number of layers of the vision pyramid being a first preset value, a down-sampling coefficient between any two adjacent layers of the vision pyramid being a second preset value; and acquire, based on the vision pyramid, a scale-invariant DVS event feature descriptor.

14. A non-transitory machine readable medium storing a program which when executed by at least one processor provides instructions for processing Dynamic Vision Sensor (DVS) events, the instructions comprising:

acquiring a first DVS event map sequence comprising a first DVS event map, and a second DVS event map sequence comprising a second DVS event map, the first DVS event map sequence and the second DVS event map sequence being of a dual-camera DVS event map sequence;

extracting a first DVS event feature descriptor from the first DVS event map, and a second DVS event feature descriptor from the second DVS event map;

determining, based on the first DVS event feature descriptor, a three-dimensional space pose of the first DVS event map at a current moment; and generating, based on the three-dimensional space pose of the first DVS event map, a generated DVS event map sequence with a temporal consistency for generating a video image, wherein the first DVS event feature descriptor having at least one from among a scale-invariant feature and a rotation-invariant feature, wherein the extracting the second DVS event feature descriptor comprises:

generating a vision pyramid for the second DVS event map, a number of layers of the vision pyramid being a first preset value, a down-sampling coefficient between any two adjacent layers of the vision pyramid being a second preset value; and acquiring, based on the vision pyramid, a scale-invariant DVS event feature descriptor, wherein the generated DVS event map sequence comprises adjacent image frames, and event distribution of the adjacent image frames and a number of events in event maps corresponding to the adjacent image frames are consistent.

15. The non-transitory machine readable medium of claim 14, further comprising, before the determining, based on the first DVS event feature descriptor, the three-dimensional space pose of the first DVS event map at the current moment:

determining, based on the first DVS event feature descriptor, a depth value corresponding to an event, wherein the determining, based on the first DVS event feature descriptor, the three-dimensional space pose of the first DVS event map at the current moment comprises:

determining, based on the depth value corresponding to the event and the first DVS event feature descriptor, the three-dimensional space pose of the first DVS event map at the current moment.

16. The non-transitory machine readable medium of claim 15, wherein the determining, based on the depth value corresponding to the event and the first DVS event feature descriptor, the three-dimensional space pose of the first DVS event map at the current moment comprises:

based on the depth value corresponding to the event and the first DVS event feature descriptor, matching the first DVS event map at the current moment with a key frame in the first DVS event map sequence; and determining, based on a result of matching, the three-dimensional space pose of the first DVS event map at the current moment.

17. The non-transitory machine readable medium of claim 16, wherein further comprising, after the determining, based on the result of the matching, the three-dimensional space pose of the first DVS event map at the current moment:

adjusting the three-dimensional space pose of the first DVS event map at the current moment so that an accumulative error generated for the first DVS event map during the matching is less than a preset value, wherein the generating, based on the three-dimensional space pose of the first DVS event map, the generated DVS event map sequence with the temporal consistency comprises:

generating, based on the three-dimensional space pose that has been adjusted, of the first DVS event map, the generated DVS event map sequence with the temporal consistency.

* * * * *